United States Patent [19]

Imamura et al.

[11] Patent Number: 4,938,614
[45] Date of Patent: Jul. 3, 1990

[54] AIR CONTROL DEVICE FOR INTERNAL COMBUSTION ENGINE

[75] Inventors: Kaneo Imamura; Kazuaki Koyanagi, both of Obu, Japan

[73] Assignee: Aisan Kogyo Kabushiki Kaisha, Obu, Japan

[21] Appl. No.: 480,550

[22] Filed: Feb. 15, 1990

Related U.S. Application Data

[62] Division of Ser. No. 432,913, Nov. 7, 1989.

[30] Foreign Application Priority Data

Dec. 10, 1988 [JP] Japan .............................. 1-160487[U]
Aug. 22, 1989 [JP] Japan .............................. 64-97580[U]

[51] Int. Cl.$^5$ ................................................. F16K 1/22
[52] U.S. Cl. ........................................ 384/537; 384/903
[58] Field of Search .................. 251/304, 305; 384/517, 384/518, 537, 585, 903

[56] References Cited

U.S. PATENT DOCUMENTS 4,549,823 10/1985 Nichting .............................. 384/537
4,880,207 11/1989 Matsumoto et al. ............ 251/305 X

FOREIGN PATENT DOCUMENTS 60-26201 8/1985 Japan.
60129538 6/1987 Japan.

*Primary Examiner*—John C. Fox
*Attorney, Agent, or Firm*—Dennison, Meserole, Pollack & Scheiner

[57] ABSTRACT

In an air control device including a body, an air passage formed in the body, a throttle valve disposed in the air passage for controlling an air quantity flowing in the air passage, a throttle shaft for mounting the throttle valve and extending across the air passage, and a pair of first and second ball bearings mounted in the body for rotatably supporting the throttle shaft; a supporting structure of the throttle valve including a first shoulder formed in the body; a first stopper fixed to the body; an inner ring of the first ball bearing engaged by interference fit with the throttle shaft; an outer ring of the first ball bearing engaged by clearance fit with the body, the outer ring being fixedly sandwiched between the first shoulder and the first stopper under the condition where a thrust is applied to the outer ring in an axial direction of the throttle shaft; a second shoulder formed in the body; a second stopper engaged by interference fit with the body; an inner ring of the second ball bearing engaged by clearance fit with the throttle shaft; and an outer ring of the second ball bearing engaged by clearance fit with the body, the outer ring being fixedly sandwiched between the second shoulder and the second stopper. Further, the surface of the throttle shaft is treated by a low-temperature salt bath nitriding process, so that fretting wear between the throttle shaft and the inner ring of the bearing engaged by clearance fit with the throttle shaft.

1 Claim, 8 Drawing Sheets

AIR CONTROL DEVICE FOR INTERNAL COMBUSTION ENGINE

This is a divisional of co-pending application Ser. No. 432,913 filed on Nov. 7, 1989.

BACKGROUND OF THE INVENTION

The present invention relates to an air control device for an internal combustion engine, and more particularly to a supporting structure of a throttle valve in such an air control device including a throttle body, a throttle shaft for mounting the throttle valve and a pair of ball bearings for rotatably supporting the throttle shaft.

Such a throttle valve supporting structure is disclosed, for example, in Japanese Patent Laid-open Publication No. 62-129538 (which, will be hereinafter referred to as a first reference) and Japanese Utility Model Publication No. 60-26201 (which will be hereinafter referred to as a second reference).

In the throttle valve supporting structure as shown in the first reference, inner rings of first and second bearings axially abut against stopper portions provided on a throttle shaft, and outer rings of the first and second bearings axially abut against engagement portions formed with a throttle body. Further, a spring such as a wave washer is interposed between the outer ring of at least one of the ball bearings and the corresponding engagement portion. The inner circumferential surfaces of the inner rings of the first and second ball bearings are engaged by clearance fit with the throttle shaft, and the outer circumferential surfaces of the outer rings are also engaged by clearance fit with the inner circumferential surfaces of the engagement portions.

On the other hand, in the throttle valve supporting structure as shown in the second reference, inner rings of first and second ball bearings are engaged by clearance fit with the throttle shaft, and outer rings of the first and second ball bearings are engaged by interference fit with the throttle body.

Generally, the throttle body is mounted directly or indirectly to the internal combustion engine, and it receives vibration of the engine. In the first reference, pressure is axially applied to the inner and outer rings by the spring so as to axially fix the throttle shaft and the throttle valve to the throttle body. However, since there are defined the clearances between the outer rings and the throttle body, the ball bearings and the throttle body are independently vibrated to cause the generation of wear between the throttle body and the ball bearings. Further, this causes another problem such that an axial clearance defined between the throttle valve and an inner wall surface of a suction passage formed in the throttle body is changed to render air control unstable. Additionally, there is also generated the wear between the throttle valve and the inner wall surface of the suction passage and between the throttle shaft and insert holes formed in the throttle body for inserting the throttle shaft, which also renders the air control unstable Although this problem may be solved to some extent by increasing the pressure of the spring, friction of the ball bearings will be increased in this case to unsmoothen the rotation of the ball bearings.

In the second reference, since the inner rings of the first and second ball bearings are engaged by clearance fit with the throttle shaft, there tends to be generated fretting wear between the throttle shaft and each inner ring to render the air control unstable. Generally, the throttle shaft is formed of carbon steel, and the inner ring is formed of quenched bearing steel. Therefore, the inner ring is harder than the throttle shaft to cause the generation of fretting wear on the throttle shaft. Recently, there has been developed a high-speed engine which will accompany a large vibration. Accordingly, it is considered important to suppress the fretting wear.

The fretting wear is considered to be suppressed by plating hard chromium, for example, onto the surface of the throttle shaft or quenching the throttle shaft to increase a hardness thereof. However, the plating method causes a large change in diameter of the throttle shaft to reduce a dimensional accuracy thereof. On the other hand, the quenching method causes the generation of strain of the throttle shaft. Thus, both the methods have a disadvantage in air controllability.

As a further method, the throttle shaft may be formed of alloy steel having a large hardness. However, such a material is high in material cost and machining cost due to bad machinability.

SUMMARY OF THE INVENTION

It is an object of the present invention to provide a supporting structure of a throttle valve in an air control device which may prevent the generation of wear between the bearings and the throttle body and between the bearings and the throttle shaft.

It is another object of the present invention to provide a supporting structure of a throttle valve in an air control device which may prevent the generation of fretting wear between the inner ring of the bearing and the throttle shaft to be engaged by clearance fit with the inner ring of the bearing, with good dimensional accuracy and at low cost.

According to a first aspect of the present invention, there is provided in an air control device including a body, an air passage formed in said body, a throttle valve disposed in said air passage for controlling an air quantity flowing in said air passage, a throttle shaft for mounting said throttle valve and extending across said air passage, and a pair of first and second ball bearings mounted in said body for rotatably supporting said throttle shaft; a supporting structure of said throttle valve comprising a first shoulder formed in said body, a first stopper fixed to said body, an inner ring of said first ball bearing engaged by interference fit with said throttle shaft, an outer ring of said first ball bearing engaged by clearance fit with said body, said outer ring being fixedly sandwiched between said first shoulder and said first stopper under the condition where a thrust is applied to said outer ring in an axial direction of said throttle shaft, a second shoulder formed in said body, a second stopper engaged by interference fit with said body, an inner ring of said second ball bearing engaged by clearance fit with said throttle shaft, and an outer ring of said second ball bearing engaged by clearance fit with said body, said outer ring being fixedly sandwiched between said second shoulder and said second stopper.

With this arrangement, the outer ring of the first ball bearing is fixed by the thrust in the axial direction of the throttle shaft, and it is also fixed in the direction perpendicular to the axial direction, that is, in the radial direction of the throttle shaft by the frictional force to be generated by the thrust. Accordingly, when the throttle body receives the vibration of the internal combustion engine, all of the throttle body, the first ball bearing and the throttle shaft are axially and radially vibrated in an integral manner, thereby preventing the generation of wear between the throttle shaft and the ball bearing and between the ball bearing and the throttle body. Furthermore, as all of the throttle body, the ball bearing and the throttle shaft are vibrated in an integral manner, an axial clearance defined between the throttle valve and the inner wall surface of the suction passage may be maintained constant, and the generation of wear between the throttle valve and the inner wall surface of the suction passage in the operation of the throttle valve may be also prevented.

Further, as the inner and outer rings of the second ball bearing are engaged by clearance fit with the throttle shaft and the throttle body, the throttle shaft and the ball bearing can be easily mounted to the throttle body. Accordingly, even if there is present an error in centering accuracy between portions of the throttle body for mounting the first and second ball bearings, this error may be absorbed by the above clearance.

According to a second aspect of the present invention, there is provided in an air control device including a body, an air passage formed in said body, a throttle valve disposed in said air passage for controlling an air quantity flowing in said air passage, a throttle shaft for mounting said throttle valve and extending across said air passage, and a pair of first and second ball bearings mounted in said body for rotatably supporting said throttle shaft, wherein an inner ring of at least one of said bearings is engaged by clearance fit with said throttle shaft; the improvement wherein a surface of said throttle shaft is treated by a low-temperature salt bath nitriding process to form a nitrogen dispersing layer on said surface and a nitride layer formed on said nitrogen dispersing layer.

As the surface of the throttle shaft is treated by the low-temperature salt bath nitriding process to form the nitrogen dispersing layer on the surface and the nitride layer on the nitrogen dispersing layer, a hardness of the surface of the throttle shaft is increased. Accordingly, even when the throttle shaft and the inner ring of the bearing engaged by clearance fit with the throttle shaft are relatively vibrated in receipt of the vibration of the engine, the fretting wear due to the relative vibration between the throttle shaft and the inner ring of the bearing can be prevented.

The invention will be more fully understood from the following detailed description and appended claims when taken with the drawings.

DETAILED DESCRIPTION OF THE PREFERRED EMBODIMENTS

Figure 1:
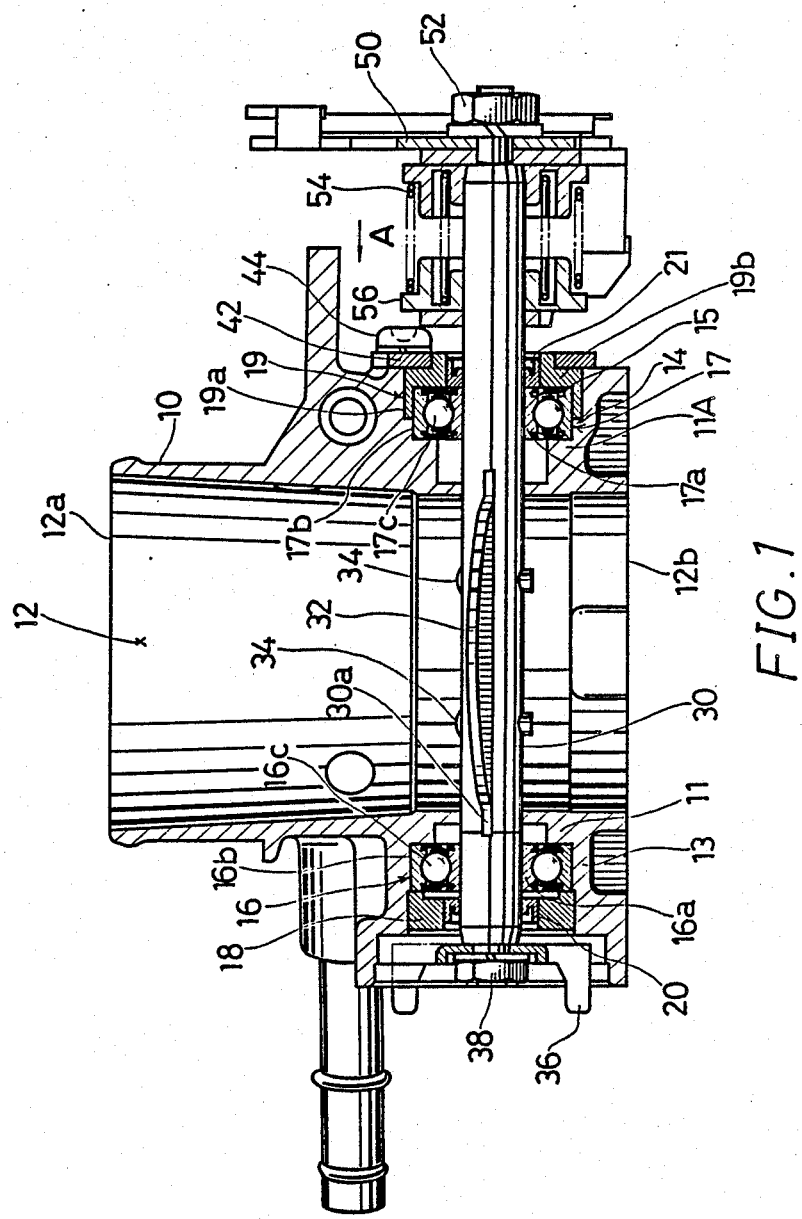
FIG. 1 is a vertical sectional view of a first preferred embodiment of the air control device according to the present invention.
Figure 2:
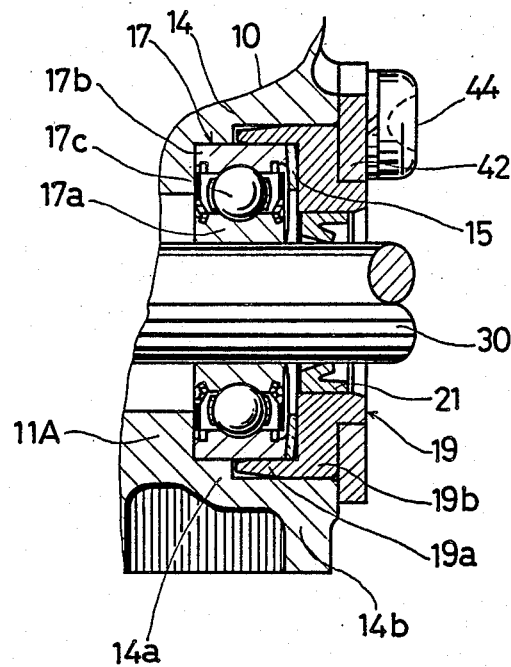
FIG. 2 is an enlarged sectional view of an essential part of the first preferred embodiment.
Figure 3:
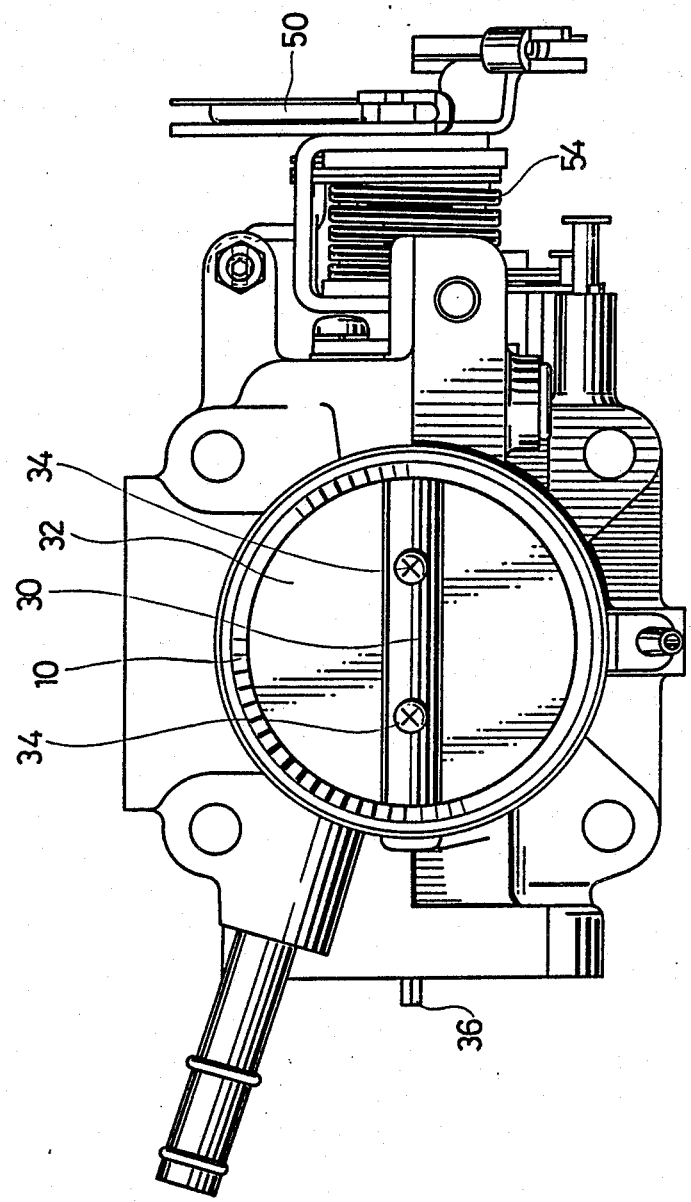
FIG. 3 is a plan view of FIG. 1.
Figure 4:
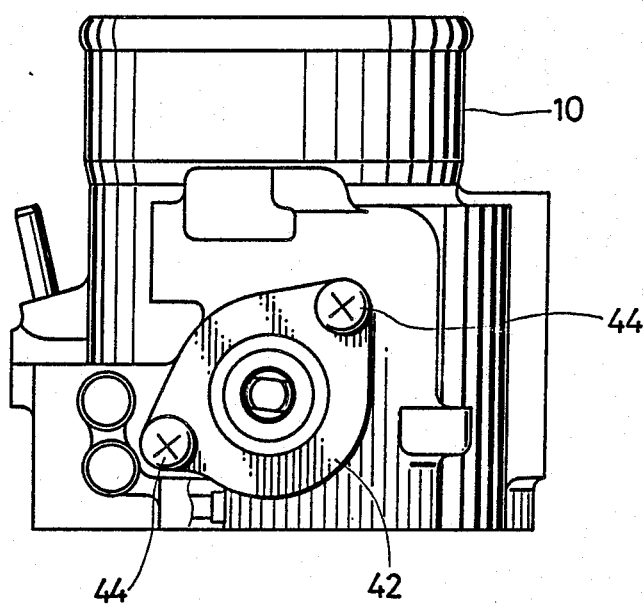
FIG. 4 is a side view taken along the arrow A in FIG. 1.

There will now be described some preferred embodiments of the present invention with reference to the drawings.

Referring first to FIGS. 1 to 4 which show a first preferred embodiment of the present invention, reference numeral 10 denotes a throttle body of an air control device to be provided in an air intake system of an internal combustion engine for a vehicle. The throttle body 10 is formed of aluminum, for example, and it is formed with a suction passage 12 for supplying from its upper opening 12a an outside air taken by an air filter (not shown) to the engine. A lower opening 12b of the suction passage 12 is connected to an intake manifold (not shown), and the suction air is supplied with a fuel to be injected from an injector (not shown) through the intake manifold to cylinders of the engine.

A throttle shaft 30 is mounted in the throttle body 10 to extend in perpendicular relationship to the suction passage 12. The throttle shaft 30 is formed with a slit 30a at a portion disposed in the suction passage 12. A throttle valve 32 is inserted into the slit 30a of the throttle shaft 30, and is fixed to the throttle shaft 30 by a pair of screws 34. Thus, the throttle valve 32 is disposed in the suction passage 12 of the throttle body 10. A clearance of 0.1 mm or less in the axial direction of the throttle shaft 30 is normally set between an outer periphery of the throttle valve 32 and an inner wall surface of the suction passage 12.

The throttle shaft 30 is rotatably supported through a pair of ball bearings 16 and 17 to the throttle body 10 at right and left sides of the throttle valve 32 as viewed in FIG. 1. As well known in the art, the left ball bearing 16 is constructed of an inner ring 16a, an outer ring 16b and a plurality of balls 16c rotatably supported between the inner ring 16a and the outer ring 16b. Similarly, the right ball bearing 17 is constructed of an inner ring 17a, an outer ring 17b and a plurality of balls 17c rotatably supported between the inner ring 17a and the outer ring 17b. The ball bearings 16 and 17 are mounted in left and right sleeve portions 13 and 14 of the throttle body 10.

More specifically, the inner ring 16a of the left ball bearing 16 is engaged by clearance fit with the throttle shaft 30, and the outer ring 16b is also engaged by clearance fit with an inner circumferential surface of the sleeve portion 13 of the throttle body 10. The clearances between the inner ring 16a and the throttle shaft 30 and between the outer ring 16b and the sleeve portion 13 are set to 0.1 mm or less. On the other hand, the inner ring 17a of the right ball bearing 17 is engaged by interference fit with the throttle shaft 30, and the outer ring 17b is engaged by clearance fit with an inner circumferential surface of a small-diameter portion 14a of the sleeve portion 14 of the throttle body 10. The clearance between the outer ring 17b and the sleeve portion 14 is set to 0.1 mm or less.

An annular stopper 18 is engaged by interference fit with the inner circumferential surface of the left sleeve portion 13 on the outside of the left ball bearing 16. Accordingly, the outer ring 16b of the left ball bearing 16 is sandwiched between the stopper 18 and an inside shoulder 11 formed at an inside end of the left sleeve portion 13. That is, the outer ring 16b of the left ball bearing 16 is axially fixed to the throttle body 10.

On the other hand, an annular stopper 19 is engaged by interference fit with an inner circumferential surface of a large-diameter portion 14b of the right sleeve portion 14 until an outside end surface of the stopper 19 becomes flush with a right end surface of the throttle body 10. The stopper 19 is formed with a thin-walled annular portion 19a having a large inner diameter and a thick-walled annular portion 19b having a small inner diameter. The inner circumferential surface of the thin-walled annular portion 19a of the stopper 19 is engaged by clearance fit with the outer circumferential surface of the outer ring 17b of the ball bearing 17 to the axially central position of the outer ring 17b. The clearance between the thin-walled annular portion 19a and the outer ring 17b is set to 0.1 mm or less. The outer circumferential surface of the thin-walled annular portion 19a at its inside end portion is tapered so as to avoid a reduction in the inner diameter of the thin-walled annular portion 19a due to the interference fit with the throttle body 10.

A spring 15 such as a wave washer is interposed between the inside end surface of the thick-walled annular portion 19b of the stopper 19 and the outside end surface of the outer ring 17b of the ball bearing 17 so as to axially inwardly bias the outer ring 19b. That is, the outer ring 17b is sandwiched through the spring 15 between the stopper 19 and an inside shoulder 11A formed at the inside end of the right sleeve portion 14. A thrust to be applied to the outer ring 17b by the spring 15 is set to 40–100 kg, for example. Thus, the outer ring 17b is axially fixed to the throttle body 10 by the thrust, and it is also radially fixed to the throttle body 10 by a frictional force due to the thrust.

A support 42 is so mounted as to abut against the outside end surface of the stopper 19 and the right end surface of the throttle body 10, and is fixed to the throttle body 10 by a pair of screws 44 (see FIG. 4), so that axial positional slippage of the stopper 19 may be prevented.

The stoppers 18 and 19 are formed of aluminum or any other materials such as brass having a coefficient of thermal expansion near that of aluminum, so as to reduce a difference in thermal expansion rate between the throttle body 10 and the stoppers 18 and 19.

An oil seal 20 formed of rubber or the like is interposed between the inner circumferential surface of the left stopper 18 and the outer circumferential surface of the throttle shaft 30. Similarly, an oil seal 21 formed of rubber or the like is interposed between the inner circumferential surface of the thick-walled annular portion 19b of the right stopper 19 and the outer circumferential surface of the throttle shaft 30. Thus, the inside of the throttle body 10 is air-tightly sealed by the oil seals 20 and 21.

A sensor lever 36 is fixedly mounted at the left end portion of the throttle shaft 30 by threadedly engaging a nut 38 with a male thread formed at the left end portion of the throttle shaft 30. The sensor lever 36 is connected to a throttle sensor (not shown) for detecting an opening angle of the throttle valve 32.

On the other hand, an accelerator lever 50 is fixedly mounted at the right end portion of the throttle shaft 30 by threadedly engaging a nut 52 with a male thread formed at the right end portion of the throttle shaft 30. The accelerator lever 50 is connected through an accelerator wire or the like to an accelerator pedal (not shown), and is rotated by depressing the accelerator pedal to thereby rotate the throttle shaft 30 and rotate the throttle valve 32 about an axis of the throttle shaft 30.

A return spring 54 is provided around the throttle shaft 30 between the accelerator lever 50 and the throttle body 10 for returning the accelerator lever 50 to an original (initial) position. The return spring 54 is mounted on a spring guide 56 fixed to the throttle shaft 30. In this manner, the length of the right portion of the throttle shaft 30 between the right ball bearing 17 to the accelerator lever 50 is larger than the length of the left portion of the throttle shaft 30 between the left ball bearing 16 and the sensor lever 36.

In operation, vibration of the internal combustion engine is transmitted to the throttle body 10 directly or indirectly mounted to the internal combustion engine. As a result, the right ball bearing 17 and the throttle shaft 30 are vibrated integrally with the throttle body 10 in the axial direction of the throttle shaft 30 and the direction perpendicular to the axial direction. Accordingly, it is possible to prevent the generation of wear between the throttle shaft 30 and the inner ring 17a of the ball bearing 17, between the outer ring 17b of the ball bearing 17 and the inner circumference of the sleeve portion 14 of the throttle body 10, and between the inner circumference of the thin-walled annular portion 19a of the stopper 19 and the outer ring 17b of the ball bearing 17. Simultaneously, it is possible to also prevent the generation of wear between the shoulder portion 11A of the throttle body 10 and the inside end surface of the ball bearing 17, between the outside end surface of the ball bearing 17 and the spring 15, and between the spring 15 and the inside end surface of the stopper 19.

The throttle valve 32 is rotated with the throttle shaft 30 in the suction passage 12 of the throttle body 10, so as to control a suction air quantity to be supplied to the engine. Since the throttle body 10, the ball bearing 17 and the throttle shaft 30 are vibrated in an integral manner, the axial clearance (0.1 mm or less) between the throttle valve 32 and the inner wall surface of the suction passage 12 can be maintained constant. Therefore, suction air control to be carried out by the throttle valve 32 can be stabilized.

The accelerator lever 50 fixed to the right end portion of the throttle shaft 30 has a mass larger than that of the sensor lever 36 fixed to the left end portion of the throttle shaft 30. Further, an operating force to be applied to the accelerator lever 50 is larger than that to be applied to the sensor lever 36. Further, as previously mentioned, the length of the portion of the throttle shaft 30 from the right ball bearing 17 to the accelerator lever 50 is larger than the length of the portion of the throttle shaft 30 from the left ball bearing 16 to the sensor lever 36. Accordingly, the right ball bearing 17 receives a larger load than the left ball bearing 16. However, according to the present invention, since the inner ring 17a of the right ball bearing 17 is fixed by interference fit to the outer circumference of the throttle shaft 30, the right ball bearing 17 can sufficiently endure such a large load.

The portion of the throttle shaft 30 between the right ball bearing 17 and the accelerator lever 50 is arcuately vibrated by the combination of the radial vibration of the throttle shaft 30 due to the vibration from the engine with the arcuate operating force applied to the accelerator lever 50. The larger the length of the portion, the larger the arcuate vibration. Accordingly, the right ball bearing 17 receives an axial component of the arcuate vibration in addition to the axial vibration from the engine. However, the spring 15 has a spring force sufficient to absorb the above-mentioned axial force. Further, since the outer ring 17b of the ball bearing 17 is urged by the thrust of the spring 15 against the shoulder portion 11A of the throttle body 10, radial movement of the outer ring 17b relative to the shoulder portion 11A and the spring 15 can be suppressed by a frictional force generated among the outer ring 17b, the shoulder portion 11A and the spring 15. Accordingly, it is possible to prevent the generation of wear thereamong.

As to the left ball bearing 16 which receives a relatively small load, there are defined the clearances between the inner ring 16a and the throttle shaft 30 and between the outer ring 16b and the inner circumferential surface of the sleeve portion 13 of the throttle body 10. Accordingly, mounting of the throttle shaft 30 to the throttle body 10 can be easily carried out. Further, the definition of the clearance between the inner ring 16a and the throttle shaft 30 can exhibit the following effect.

That is, if the inner ring 16a of the ball bearing 16 is fixed by interference fit to the throttle shaft 30, and in the case that an error in centering accuracy of the left and right sleeve portions 13 and 14 of the throttle body 10 is present, the outer ring 16b would be engaged by partial interference fit with the inner circumferential surface of the left sleeve portion 13. As a result, perpendicularity between the throttle shaft 30 and the ball bearing 16 cannot be obtained, causing unsmoothness of rotation of the ball bearing 16.

To solve this problem, the preferred embodiment is constructed to define the clearance between the inner ring 16a of the ball bearing 16 and the outer circumference of the throttle shaft 30. As to the generation of wear at the left ball bearing 16, since the load of the ball bearing 16 is small, the wear between the inner ring 16a and the throttle shaft 30 is not so serious though the clearance is defined therebetween.

Further, since the outer ring 16b of the left ball bearing 16 is fixedly sandwiched between the stopper 18 and the shoulder portion 11 of the throttle body 10, and the inner ring 16a is engaged by clearance fit with the throttle shaft 30, the ball bearing 16 is vibrated integrally with the throttle body 10 to prevent the generation of wear therebetween.

Further, since both the stoppers 18 and 19 are fixed by interference fit to the sleeve portions 13 and 14 of the throttle body 10, respectively, reliable sealing can be obtained between the suction passage 12 of the throttle body 10 and the outside thereof. Especially, since the material of the stoppers 18 and 19 has a thermal expansion rate equal to or near that of the throttle body 10, interference of the stoppers 18 and 19 can be maintained constant in respect of temperature change, thereby stabilizing the sealability.

Figure 5:
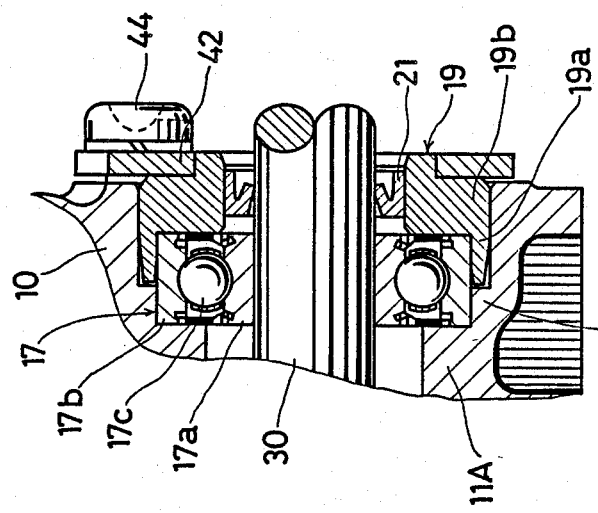
FIG. 5 is an enlarged sectional view of an essential part of a second preferred embodiment according to the present invention.

Referring to FIG. 5 which shows an essential part of a second preferred embodiment of the present invention, wherein the same reference numerals as those in the first preferred embodiment denote the same parts, the outer circumference of the stopper 19 is engaged by clearance fit with the inner circumference of the sleeve portion 14 of the throttle body 10. The clearance is set to be 0.1 mm or less. The inside end surface of the stopper 19 directly abuts against the outside end surface of the outer ring 17b of the left ball bearing 17, and the outside end surface of the stopper 19 projects from the right end surface of the throttle body 10. The support 42 is disposed to abut against only the outside end surface of the stopper 19, and is fixed by the screws 44 to the throttle body 10.

With this construction, the outer ring 17b of the ball bearing 17 is fixedly sandwiched between the shoulder portion 11A of the throttle body 10 and the inside end surface of the stopper 19 under the condition where a thrust is axially applied through the support 42 to the outer ring 17b by tightening the screws 44. Thus, the outer ring 17b of the ball bearing 17 is fixed to the throttle body 10 with respect to both the axial and radial directions. The other construction is the same as that of the first preferred embodiment.

Accordingly, when the vibration is transmitted from the engine to the throttle body 10, the ball bearing 17 and the throttle shaft 30 are vibrated integrally with the throttle body 10 with respect to both the axial and radial directions in the same manner as the first preferred embodiment.

Figure 6:
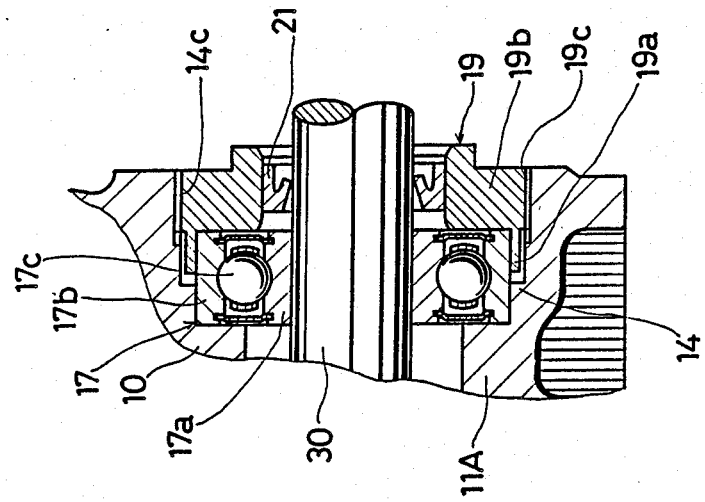
FIG. 6 is an enlarged sectional view of an essential part of a third preferred embodiment according to the present invention.

Referring to FIG. 6 which shows an essential part of a third preferred embodiment of the present invention wherein the same reference numerals as those in the previous preferred embodiments denote the same parts, the stopper 19 is formed at its outer circumference with a threaded portion 19c to be engaged with a threaded portion 14c formed on the inner circumference of the sleeve portion 14 of the throttle body 10. The threaded portion 19c of the stopper 19 is threadedly engaged with the threaded portion 14c of the sleeve portion 14 until the inside end surface of the stopper 19 abuts against the outside end surface of the outer ring 17b of the ball bearing 17, and the inside end surface of the outer ring 17b abuts against the shoulder portion 11A of the throttle body 10.

With this construction, the outer ring 17b of the ball bearing 17 is fixedly sandwiched between the stopper 19 and the shoulder portion 11A of the throttle body 10 under the condition where a thrust is axially applied directly to the outer ring 17b by tightening the stopper 19 with respect to the sleeve portion 14. Thus, the outer ring 17b of the ball bearing 17 is fixed to the throttle body 10 with respect to both the axial and radial directions. The other construction is the same as that of the first preferred embodiment.

Accordingly, when the vibration is transmitted from the engine to the throttle body 10, the ball bearing 17 and the throttle shaft 30 are vibrated integrally with the throttle body 10 with respect to both the axial and radial directions in the same manner as the first preferred embodiment.

Figure 7:
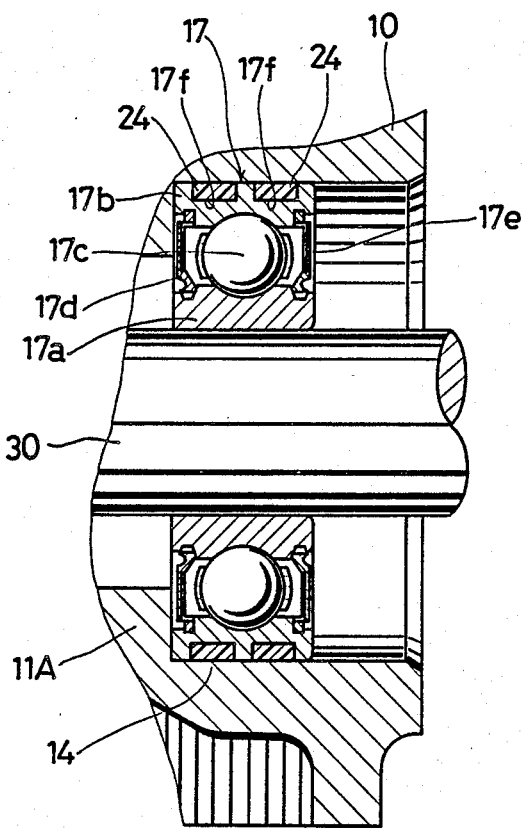
FIG. 7 is an enlarged sectional view of an essential part of a fourth preferred embodiment according to the present invention.

Referring to FIG. 7 which shows an essential part of a fourth preferred embodiment of the present invention wherein the same reference numerals as those in the previous preferred embodiments denote the same parts, a pair of seals 17d and 17e are provided on the opposite sides of the ball 17c of the right ball bearing 17. There are defined clearances between the ball 17c and the inner ring 17a and between the ball 17c and the outer ring 17b. For example, the radial clearances are set to be 5-40 microns, and the axial clearances are set to be 50-200 microns.

The outer ring 17b of the ball bearing 17 is formed at its outer circumference with a pair of annular grooves 17f. A pair of ring members 24 are fitted in the annular grooves 17f. The ring members 24 are formed of a material such as resin having a thermal expansion rate equal to or near that of the throttle body 10 formed of aluminum. For example, the ring members 24 are formed integrally with the outer ring 17b. The outer diameter of the outer ring 17b is substantially the same as the outer diameter of the ring members 24 at ordinary temperatures (15°-30° C.). The outer ring 17b is formed of iron material such as bearing steel having a thermal expansion rate smaller than that of the ring members 24. Thus, the ring members 24 fixed to the outer ring 17b are engaged by interference fit with the inner circumferential surface of the sleeve portion 14 of the throttle body 10 until the inside end surface of the outer ring 17b abuts against the shoulder 11A of the throttle body 10. The interference is set to be 5-40 microns, for example. In this manner, as the outer ring 17b is press-fitted at the ring members with the throttle body 10, the stopper 19 used in the previous preferred embodiments is not used in the fourth preferred embodiment. The other construction is the same as that of the first preferred embodiment.

Accordingly, when the vibration is transmitted from the engine to the throttle body 10, the ball bearing 17 and the throttle shaft 30 are vibrated integrally with the throttle body 10 with respect to both the axial and radial directions in the same manner as the first preferred embodiment.

Generally, if both the inner ring 17a and the outer ring 17b are engaged by interference fit with the throttle shaft 30 and the sleeve portion 14 of the throttle body 10, respectively, the inner diameter of the inner ring 17a is increased and the outer diameter of the outer ring 17b is decreased by the interference fit. As a result, the radial clearances defined between the ball 17c and the inner ring 17a and between the ball 17c and the outer ring 17b are decreased to hinder smooth rotation of the ball 17c. In addition, if the inner ring 17a and the outer ring 17b are axially fixed, the axial clearances defined between the ball 17c and the inner ring 17a and between the ball 17c and the outer ring 17b are varied by axial slippage to hinder smooth rotation of the ball 17c. Particularly, when the throttle body 10 is formed of aluminum, and the outer ring 17b is formed of iron material, the inner diameter of the sleeve portion 14 of the throttle body 10 is varied more largely than the outer diameter of the outer ring 17b at high temperatures since the thermal expansion rate of the throttle body 10 is larger than that of the outer ring 17b, causing the generation of a radial clearance between the sleeve portion and the outer ring 17b. Although such a radial clearance can be eliminated by increasing the interference between the sleeve portion and the outer ring 17b, the unsmooth rotation of the ball 17c tends to occur.

The above-mentioned problem can be solved by the construction of the fourth preferred embodiment. That is, as the ring members 24 fixed to the outer ring 17b are expanded at high temperatures with the expansion rate substantially equal to that of the sleeve portion 14 of the throttle body 10, the interference between the outer circumferences of the ring members 24 and the inner circumference of the sleeve portion 14 is maintained constant. Accordingly, the throttle body 10, the ball bearing 17 and the throttle shaft 30 are vibrated in an integral manner even at high temperatures. Further, as the interference can be maintained constant irrespective of temperature change, the generation of the radial clearance between the outer ring 17b and the sleeve portion 10 can be eliminated in spite of the fact that the interference is set to be very small. Further, the problem of unsmooth rotation of the ball 17c due to the interference fit of the inner and outer rings 17a and 17b can be eliminated.

Further, the fourth preferred embodiment does not employ the oil seal 21 used in the previous preferred embodiments since the ring members 24 fixed to the outer ring 17b are press-fitted with the inner circumference of the sleeve portion 14 and the ring members 24 are formed of a material having a thermal expansion rate equal to or near that of the throttle body 10. That is, the sealability can be made reliable even without the oil seal 21.

FIGS. 8 to 11 show some preferred embodiments of the surface treatment of the throttle shaft according to the present invention.

Figure 8:
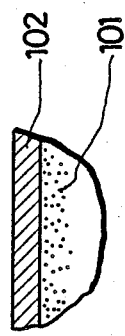
FIG. 8 is an enlarged sectional view of a treated surface of the throttle shaft treated by a first preferred embodiment of the low-temperature salt bath nitriding.

Referring to FIG. 8 which is an enlarged sectional view of a first preferred embodiment of the surface treatment, the surface of the throttle shaft 30 formed of carbon steel, for example, is treated by a low-temperature salt bath nitriding process (e.g., Tufftride process; Tufftride is a registered tradename) to form a nitrogen dispersing layer 101 on the surface of the material of the throttle shaft and a nitride layer 102 on the nitrogen dispersing layer 101.

Figure 9:
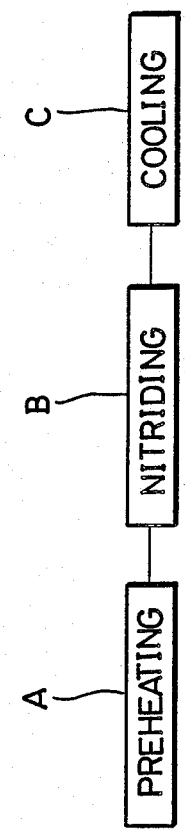
FIG. 9 is a block diagram of the process of the first preferred embodiment of the low-temperature salt bath nitriding.

FIG. 9 shows the process of the surface treatment of the first preferred embodiment shown in FIG. 8. The process includes a first step of preheating the material of the throttle shaft 30 at about 350° C., a second step of immersing the material obtained in the first step into a nitriding salt bath containing mainly a cyan salt and a cyanic acid salt at about 580° C. for a predetermined period of time (e.g., 10-80 minutes), and a third step of cooling the material obtained in the second step in the salt bath at about 400° C. for a predetermined period of time (e.g., 5-20 minutes). According to this process, the nitride layer 102 is formed on the surface of the material, and the nitrogen dispersing layer 101 is formed beneath the nitride layer 102. Such a low-temperature salt bath nitriding process is disclosed in Japanese Patent Laid-open Publication Nos. 49-119839 and 51-50241, for example.

The treated surface of the throttle shaft 30 as treated above may be polished according to a demanded surface roughness.

As the surface of the throttle shaft 30 is treated by the low-temperature salt bath nitriding process, a hardness of the surface of the throttle shaft 30 may be increased to be substantially equal to that of the inner ring 16a of the ball bearing 16. Accordingly, even though the inner ring 16a and the throttle shaft 30 are relatively vibrated because of the clearance defined therebetween, the fretting wear of the throttle shaft 30 due to such a relative vibration can be prevented. As a result, the clearance between the inner ring 16a and the throttle shaft 30 is maintained constant to thereby ensure smooth rotation of the throttle shaft 30 and reliable control of the suction air.

According to the above-mentioned preferred embodiment, a change in diameter of the throttle shaft 30 may be reduced not to affect the dimensional accuracy, and the strain of the throttle shaft 30 is less generated. Further, the material for the throttle shaft may be selected from carbon steel or the like which is low in material cost and machining cost (easy machinability such as formation of the slit 30a and formation of the threads at the opposite ends of the throttle shaft 30).

Figure 10:
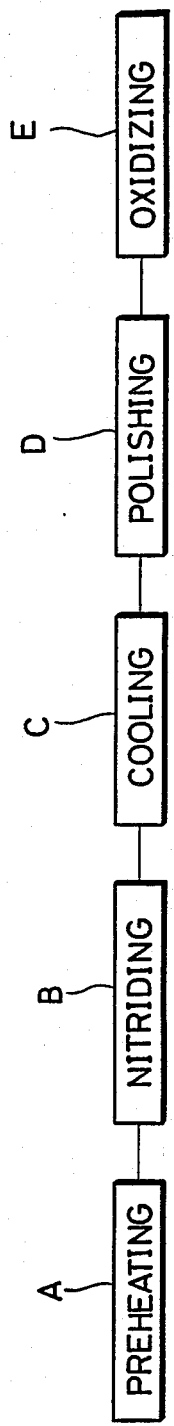
FIG. 10 is a block diagram of the process of a second preferred embodiment of the low-temperature salt bath nitriding.

FIG. 10 shows a second preferred embodiment of the process of the surface treatment according to the present invention, wherein the same reference characters as those in FIG. 9 denote the same parts.

Figure 11:
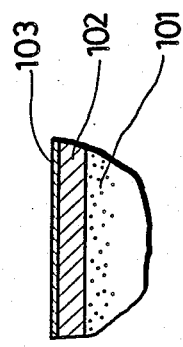
FIG. 11 is a view similar to FIG. 8, showing the treated surface of the throttle shaft treated by the second preferred embodiment of the low-temperature salt bath nitriding.

In the second preferred embodiment shown in FIG. 10, the process includes steps D and E in addition to the steps A, B and C mentioned above with reference to FIG. 9. That is, after the cooling step C, the surface of the throttle shaft 30 is polished according to a demanded surface roughness in the step D. Thereafter, the throttle shaft 30 is immersed again in the salt bath at about 400° C. for a predetermined period of time (e.g., 3-10 minutes). As a result, an oxide film layer 103 is formed on the nitride layer 102 as shown in FIG. 11, thereby obtaining the treated surface of the throttle shaft 30 which is improved in anti-corrosive property and sliding characteristic in addition to the effect obtained in the first preferred embodiment of this process.

Although the above-mentioned surface treatment is applied to the throttle shaft 30 engaged by clearance fit with the inner ring 16a of the ball bearing 16, it may be applied to the supporting structure such that the inner rings 16a and 17a of both the ball bearings 16 and 17 are engaged by clearance fit with the throttle shaft 30 as mentioned in the second reference. Further, the ball bearing may be replaced by a roller bearing and a needle bearing. Further, the material of the throttle shaft 30 may be selected from any steels other than carbon steel, cast iron, sintered alloy, etc.

Having thus described the preferred embodiments of the invention, it should be understood that numerous structural modifications and adaptations may be made without departing from the spirit of the invention.

What is claimed is:

1. In an air control device including a body, an air passage formed in said body, a throttle valve disposed in said air passage for controlling an air quantity flowing in said air passage, a throttle shaft for mounting said throttle valve and extending across said air passage, and a pair of first and second ball bearings mounted in said body for rotatably supporting said throttle shaft; a supporting structure of said throttle valve comprising:

an inner ring of said first ball bearing engaged by interference fit with said throttle shaft;
an outer ring of said first ball bearing engaged by clearance fit with said body;
an annular groove formed on an outer circumference of said outer ring of said first ball bearing;
a ring member fitted in said annular groove of said outer ring and engaged by interference fit with said body, said ring member being formed of a material having a thermal expansion rate equal to or near that of said body;
a shoulder formed in said body;
a stopper engaged by interference fit with said body;
an inner ring of said second ball bearing engaged by clearance fit with said throttle shaft; and
an outer ring of said second ball bearing engaged by clearance fit with said body, said outer ring being fixedly sandwiched between said shoulder and said stopper.

* * * * *

UNITED STATES PATENT AND TRADEMARK OFFICE
CERTIFICATE OF CORRECTION

PATENT NO.   : 4,938,614
DATED        : July 3, 1990
INVENTOR(S)  : Imamura et al It is certified that error appears in the above-identified patent and that said Letters Patent is hereby corrected as shown below:

Front page of patent, under "Foreign Application Priority Data":
change "1-160487" to --63-160487--; change "64-97580" to --1-97580--.

Signed and Sealed this

Twenty-fourth Day of December, 1991

Attest:

HARRY F. MANBECK, JR.

*Attesting Officer*   *Commissioner of Patents and Trademarks*